(12) United States Patent
Rached

(10) Patent No.: US 8,486,294 B2
(45) Date of Patent: Jul. 16, 2013

(54) HYDROFLUOROOLEFIN COMPOSITIONS

(75) Inventor: Wissam Rached, Chaponost (FR)

(73) Assignee: Arkema France, Colombes (FR)

( * ) Notice: Subject to any disclaimer, the term of this patent is extended or adjusted under 35 U.S.C. 154(b) by 396 days.

(21) Appl. No.: 12/996,212

(22) PCT Filed: May 14, 2009

(86) PCT No.: PCT/FR2009/050891
§ 371 (c)(1),
(2), (4) Date: Dec. 3, 2010

(87) PCT Pub. No.: WO2010/000995
PCT Pub. Date: Jan. 7, 2010

(65) Prior Publication Data
US 2011/0089366 A1    Apr. 21, 2011

(30) Foreign Application Priority Data
Jun. 11, 2008   (FR) ..................... 08 53861

(51) Int. Cl.
*C09K 5/04* (2006.01)
*B01F 1/00* (2006.01)
*B29C 44/00* (2006.01)

(52) U.S. Cl.
USPC ............. 252/67; 252/78.1; 252/364; 264/53; 222/635

(58) Field of Classification Search
USPC ............... 252/67, 78.1, 364; 264/53; 222/635
See application file for complete search history.

(56) References Cited

U.S. PATENT DOCUMENTS

| | | | | |
|---|---|---|---|---|
| 2005/0247905 A1* | 11/2005 | Singh et al. | ..................... | 252/67 |
| 2006/0022166 A1* | 2/2006 | Wilson et al. | .................. | 252/68 |
| 2006/0043330 A1* | 3/2006 | Wilson et al. | .................. | 252/67 |
| 2006/0243944 A1* | 11/2006 | Minor et al. | .................... | 252/67 |
| 2008/0230738 A1* | 9/2008 | Minor et al. | .................... | 252/67 |

FOREIGN PATENT DOCUMENTS

| | | |
|---|---|---|
| JP | H4-11038 | 4/1992 |
| WO | WO 2004/037913 | 5/2004 |
| WO | WO 2005/105947 | 11/2005 |
| WO | WO 2006/094303 | 9/2006 |
| WO | WO 2008076272 A2 * | 6/2008 |

* cited by examiner

*Primary Examiner* — Douglas McGinty
(74) *Attorney, Agent, or Firm* — Steven D. Boyd

(57) ABSTRACT

The present invention relates to compositions containing hydrofluoroolefins and to the uses thereof as heat transfer fluids, blowing agents, solvents and aerosols. More particularly, the invention relates to compositions having: 10 to 90% by weight, of 2,3,3,3-tetrafluoropropene, 5 to 85% by weight of HFC-134a and 2 to 20% by weight of HFC-152a.

8 Claims, No Drawings

HYDROFLUOROOLEFIN COMPOSITIONS

FIELD OF THE INVENTION

The present invention relates to compositions including hydrofluoroolefins and to their uses as heat transfer fluids, blowing agents, solvents and aerosols.

BACKGROUND OF THE INVENTION

The problems posed by substances which deplete the atmospheric ozone layer (ODP: ozone depletion potential) were treated at Montreal, where the protocol imposing a reduction on the production and use of chlorofluorocarbons (CFCs) was signed. This protocol has formed the subject of amendments which have required that CFCs be withdrawn and have extended regulatory control to other products, including hydrochlorofluorocarbons (HCFCs).

The refrigeration industry and that for the production of air conditioning have invested a great deal in the replacement of these refrigerants and thus it is that hydrofluorocarbons (HFCs) have been marketed.

The (hydro)chlorofluorocarbons used as blowing agents or solvents have also been replaced by HFCs.

In the motor vehicle industry, the air conditioning systems for vehicles sold in many countries have changed from a chlorofluorocarbon (CFC-12) refrigerant to a hydrofluorocarbon (1,1,1,2-tetrafluoroethane: HFC-134a) refrigerant which is less harmful to the ozone layer. However, from the viewpoint of the objectives set by the Kyoto protocol, HFC-134a (GWP=1300) is regarded as having a high heating power. The contribution to the greenhouse effect of a refrigerant is quantified by a criterion, the GWP (Global Warming Potential), which epitomizes the heating power, a reference value of 1 being taken for carbon dioxide.

As carbon dioxide is non-toxic and non-flammable and has a very low GWP, it has been proposed as refrigerant for air conditioning systems as a replacement for HFC-134a. However, there are several disadvantages to the use of carbon dioxide, related in particular to the very high pressure of the use thereof as coolant in existing devices and technologies.

The document JP 4110388 describes the use of hydrofluoropropenes of formula $C_3H_mF_n$, with m and n representing an integer between 1 and 5 inclusive and m+n=6, as heat transfer fluids, in particular tetrafluoropropene and trifluoropropene.

The document WO 2004/037913 discloses the use of compositions comprising at least one fluoroalkene having three or four carbon atoms, in particular pentafluoropropene and tetrafluoropropene, preferably having a GWP at most of 150, as heat transfer fluids.

The document WO 2005/105947 teaches the addition to the tetrafluoropropene, preferably 1,3,3,3-tetrafluoropropene, of a coblowing agent, such as difluoromethane (HFC-32), pentafluoroethane (HFC-125), tetrafluoroethane, difluoroethane, heptafluoropropane, hexafluoropropane, pentafluoropropane, pentafluorobutane, water and carbon dioxide.

The document WO 2006/094303 discloses an azeotropic composition comprising 70.4% by weight of 2,3,3,3-tetrafluoropropene (1234yf) and 29.6% by weight of 1,1,1,2-tetrafluoroethane (HFC-134a). This document also discloses an azeotropic composition comprising 91% by weight of 2,3,3,3-tetrafluoropropene and 9% by weight of difluoroethane (HFC-152a).

DETAILED DESCRIPTION OF THE INVENTION

The Applicant Company has now developed compositions including hydrofluoropropenes which do not exhibit the abovementioned disadvantages and which have both a zero ODP and a lower GWP than that of existing HFCs, such as R407C (ternary mixture of HFC-134a (52% by weight), HFC-125 (25% by weight) and HFC-32 (23% by weight)).

In addition, these compositions are quasiazeotropic.

The compositions according to the present invention are characterized in that they comprise from 10 to 90% by weight of 2,3,3,3-tetrafluoropropene, from 5 to 85% by weight of HFC-134a and from 2 to 20% by weight of HFC-152a.

According to a preferred form of the invention, the compositions comprise from 2 to 15% by weight of HFC-152a, from 15 to 70% by weight of 2,3,3,3-tetrafluoropropene and from 15 to 70% by weight of HFC-134a.

The compositions comprising 10-11% by weight of HFC-152a, 82-83% by weight of 2,3,3,3-tetrafluoropropene and 6-7% by weight of HFC-134a are particularly advantageous. These compositions are azeotropic and have a boiling point of −29.5° C. (+ or −0.5° C.) at a pressure of 1 bar absolute.

Advantageously, the compositions according to the present invention essentially comprise 2,3,3,3-tetrafluoropropene, HFC-134a and HFC-152a as hydrofluorocarbons (saturated or unsaturated).

The compositions according to the present invention can be used as heat transfer fluids and are particularly suitable for compression systems for air conditioning and heating, in particular heat pumps, preferably as replacement for R407C and HFC-134a. These compositions can replace R407C in new installations while, for HFC-134a, replacement is suitable both for existing installations and for new installations.

The compositions according to the present invention can comprise a stabilizer for 2,3,3,3-tetrafluoropropene. The stabilizer represents at most 5% by weight, with respect to the total composition.

Mention may in particular be made, as stabilizers, of nitromethane, ascorbic acid, terephthalic acid, azoles, such as tolutriazole or benzotriazole, phenolic compounds, such as tocopherol, hydroquinone, t-butylhydroquinone or 2,6-di(tert-butyl)-4-methylphenol, epoxides (alkyl, optionally fluorinated or perfluorinated, or alkenyl or aromatic), such as n-butyl glycidyl ether, hexanediol diglycidyl ether, allyl glycidyl ether or butylphenyl glycidyl ether, phosphites, phosphates, phosphonates or thiols and lactones.

The compositions according to the present invention can comprise lubricating agents, such as mineral oil, alkylbenzene, polyalkylene glycol and polyvinyl ether.

The compositions according to the present invention can additionally be used as blowing agents, aerosols and solvents.

Experimental Part

The performances of the compositions according to the present invention in air conditioning and heat pump operating conditions are given in the table below. The values of the various constituents (1234yf, 134a and 152a) are given as percentage by weight.

Evaporation temperature: −5° C.
Condensation temperature: 70° C.
Compressor inlet temperature: 5° C.
Temperature of the subcooled liquid: 65° C.
Isentropic efficiency of the compressor: 70%
Evap P: pressure in the evaporator
Cond P: pressure in the condenser
Ratio: the compression ratio
T comp outlet: temperature at the compressor outlet
COP: coefficient of performance and is defined, where a heat pump is concerned, as being the ratio of the useful hot power supplied by the system to the power introduced or consumed by the system.

The COP values are greater than the values obtained with R407C and, in addition, the compositions according to the invention are azeotropic or quasiazeotropic.

| Products | | | Evap P (kPa) | Cond P (kPa) | Ratio (w/w) | T comp outlet | Capacity (KJ/m$^3$) | COP |
|---|---|---|---|---|---|---|---|---|
| | R407C | | 385.68 | 3442.55 | 8.93 | 126.60 | 1461 | 2.1 |
| 1234yf | 134a | 152a | | | | | | |
| 90 | 5 | 5 | 266.96 | 1987.74 | 7.45 | 89.97 | 965.61 | 2.3 |
| 70 | 25 | 5 | 270.15 | 1996.67 | 7.39 | 90.96 | 986.45 | 2.3 |
| 50 | 45 | 5 | 266.26 | 2017.93 | 7.58 | 93.53 | 1010.98 | 2.3 |
| 30 | 65 | 5 | 257.14 | 2047.39 | 7.96 | 97.49 | 1044.55 | 2.3 |
| 10 | 85 | 5 | 245.44 | 2081.77 | 8.48 | 102.68 | 1092.91 | 2.4 |
| 80 | 10 | 10 | 268.52 | 1958.26 | 7.29 | 90.62 | 984.02 | 2.3 |
| 70 | 20 | 10 | 268.44 | 1958.04 | 7.29 | 91.26 | 992.13 | 2.3 |
| 60 | 30 | 10 | 266.65 | 1963.44 | 7.36 | 92.37 | 1001.44 | 2.3 |
| 50 | 40 | 10 | 263.40 | 1973.79 | 7.49 | 93.91 | 1012.82 | 2.3 |
| 40 | 50 | 10 | 258.99 | 1988.43 | 7.68 | 95.84 | 1027.18 | 2.3 |
| 30 | 60 | 10 | 253.77 | 2006.73 | 7.91 | 98.12 | 1045.34 | 2.4 |
| 20 | 70 | 10 | 248.05 | 2028.11 | 8.18 | 100.67 | 1067.93 | 2.4 |
| 10 | 80 | 10 | 242.07 | 2052.08 | 8.48 | 103.64 | 1095.38 | 2.4 |
| 80 | 5 | 15 | 267.94 | 1939.06 | 7.24 | 91.31 | 996.91 | 2.3 |
| 60 | 25 | 15 | 264.78 | 1932.24 | 7.30 | 92.94 | 1009.30 | 2.3 |
| 40 | 45 | 15 | 256.37 | 1953.90 | 7.62 | 96.48 | 1031.77 | 2.4 |
| 20 | 65 | 15 | 245.22 | 1998.02 | 8.15 | 101.67 | 1071.57 | 2.4 |
| 70 | 10 | 20 | 266.23 | 1915.88 | 7.20 | 92.71 | 1016.26 | 2.3 |
| 60 | 20 | 20 | 263.31 | 1910.88 | 7.26 | 93.72 | 1020.63 | 2.3 |
| 50 | 30 | 20 | 259.20 | 1914.87 | 7.39 | 95.26 | 1027.88 | 2.4 |
| 40 | 40 | 20 | 254.23 | 1927.16 | 7.58 | 97.26 | 1039.17 | 2.4 |
| 30 | 50 | 20 | 248.70 | 1946.87 | 7.83 | 99.60 | 1055.32 | 2.4 |
| 20 | 60 | 20 | 242.88 | 1973.05 | 8.12 | 102.61 | 1076.89 | 2.4 |

The temperature glide at the evaporator is 4° C. for R407C while it is at most 0.2° C. for the compositions according to the invention.

The invention claimed is:

1. A composition comprising from 10 to 90% by weight of 2,3,3,3-tetrafluoropropene, from 5 to 85% by weight, of HFC-134a and from 2 to 20% by weight of HFC-152a.

2. The composition according to claim 1, characterized in that it comprises from 2 to 15% by weight of HFC-152a, from 15 to 70% by weight of 2,3,3,3-tetrafluoropropene and from 15 to 70% by weight of HFC-134a.

3. The composition according to claim 1, characterized in that it comprises 10 to 11% by weight of HFC-152a, 82 to 83% by weight of 2,3,3,3-tetrafluoropropene and from 6 to 7% by weight of HFC-134a.

4. The composition according to claim 1, characterized in that it is (quasi)azeotropic.

5. A heat transfer fluid comprising from 10 to 90% by weight of 2,3,3,3-tetrafluoropropene, from 5 to 85% by weight, of HFC-134a and from 2 to 20% by weight of HFC-152a.

6. A blowing agent comprising from 10 to 90% by weight of 2,3,3,3-tetrafluoropropene, from 5 to 85% by weight, of HFC-134a and from 2 to 20% by weight of HFC-152a.

7. A solvent comprising from 10 to 90% by weight of 2,3,3,3-tetrafluoropropene, from 5 to 85% by weight, of HFC-134a and from 2 to 20% by weight of HFC-152a.

8. An aerosol comprising from 10 to 90% by weight of 2,3,3,3-tetrafluoropropene, from 5 to 85% by weight, of HFC-134a and from 2 to 20% by weight of HFC-152a.

* * * * *